United States Patent

Taube et al.

Patent Number: 5,979,495
Date of Patent: Nov. 9, 1999

[54] ADJUSTABLE LOW FLOW HIGH PRESSURE REGULATOR

[76] Inventors: Frank A. Taube, 6160 Mariner Sands Dr., Stuart, Fla. 34997; Anthony J. Vizzini, 914 Windmill La., Silver Springs, Md. 20905

[21] Appl. No.: 08/996,166

[22] Filed: Dec. 22, 1997

[51] Int. Cl.⁶ .......................................... G05D 7/01
[52] U.S. Cl. .......................................... 137/501; 251/127
[58] Field of Search .................................. 137/501, 504; 251/127

[56] References Cited

U.S. PATENT DOCUMENTS

| | | | |
|---|---|---|---|
| 2,265,888 | 12/1941 | Beck | 137/69 |
| 2,568,123 | 9/1951 | Goldberg | 138/43 |
| 2,850,038 | 9/1958 | Shabaker | 137/505.13 |
| 3,143,145 | 8/1964 | Kauss | 138/43 |
| 3,586,036 | 6/1971 | Barnes | 137/501 X |
| 3,643,685 | 2/1972 | Hays | 137/501 |
| 3,791,619 | 2/1974 | Pett | 251/45 |
| 3,841,354 | 10/1974 | McDonnell | 138/43 |

FOREIGN PATENT DOCUMENTS 59-117614  7/1984  Japan ...................................... 137/501

*Primary Examiner*—Stephen M. Hepperle
*Attorney, Agent, or Firm*—Charles W. Chandler

[57] ABSTRACT

A low flow, high pressure fluid regulator in which fluid is passed successively through two impeller chambers, each having a pressure differential operated impeller for monitoring changing inlet and outlet fluid pressures to maintain a constant fluid flow rate. The impeller in the second impeller chamber limits the pressure drop of fluid discharged from the first impeller chamber.

9 Claims, 2 Drawing Sheets

ADJUSTABLE LOW FLOW HIGH PRESSURE REGULATOR

BACKGROUND OF THE INVENTION

Fluid flow control regulators are used to provide a constant flow rate by means of a pressure differential regulating device that senses changes in upstream or downstream pressure and compensates for the change. Conventional regulating devices use an impeller that is sensitive to a variable incoming fluid pressure, $P_1$, and a downstream fluid pressure, $P_3$. The impeller reduces a valve opening when the differential pressure between $P_1$ and $P_2$ increases, and enlarges the valve opening, when the differential between $P_1$ and $P_2$ is reduced.

An impeller spring biases the impeller against $P_1$. A lesser fluid pressure $P_2$ acts on the opposite side of the impeller from $P_1$. The impeller assumes a balanced condition when $P_2$ plus the impeller spring force equals $P_1$. This occurs when $P_1$ and $P_2$ have reached a stable condition.

If $P_1$ increases, the impeller moves from its stable position because $P_1$ is greater than $P_2$ plus the spring force, thereby reducing the valve opening. $P_2$ then increases until $P_2$ plus the spring force again equal $P_1$ at a new stable impeller position.

If $P_1$ reduces, the impeller moves in the opposite direction from its stable position because $P_2$ plus the spring force are greater than $P_1$. The impeller moves until $P_2$ reduces to a level where $P_2$ plus the spring force equal $P_1$ at a new impeller position corresponding to a valve position that restores the desired flow rate. The impeller thereby automatically adjusts to restore a predetermined pressure difference between $P_1$ and $P_2$ which is determined by the force characteristic of the spring.

The impeller is also indirectly sensitive to the difference between $P_2$ and $P_3$ (the downstream pressure). The impeller does not directly sense $P_3$. However, the required area of the outlet valve opening must increase or decrease based on the differential pressure between $P_2$ and $P_3$. As $P_3$ increases, the efficiency of the valve hole decreases and thereby reduces the flow which increases $P_2$ affecting the pressure balance on the impeller which then moves in the opposite direction from its stable position because $P_2$ plus the spring force exceeds $P_1$. The flow accuracy of the regulating device is not significantly affected by $P_3$, however when the difference between $P_2$ and $P_3$ becomes very large, for example, 12,000 p.s.i., then the impeller must travel a greater distance, increasing the compression of the spring, which changes the pressure differential and creates an error in the regulating device.

Another problem with conventional flow regulating devices used to accommodate a high pressure but low flow rate condition is the capacity of the sensing orifice device through which the incoming fluid passes as it flows from the high pressure side ($P_1$) to the low pressure side ($P_2$) of the impeller. The orifice device can be adjusted to increase or reduce the desired flow rate.

The orifice hole size is critical. A high pressure, low flow situation requires a very small hole. However, a small hole size tends to become plugged with material carried by the fluid. Therefore it is desirable to have a hole with the largest area possible. An example is where the flow rate must be maintained between a fraction of a gallon and 1250 gallons per day, with incoming pressures as high as 12,900 p.s.i.g.

Hole size can be increased by providing a resistance to flow through the device by means other than reducing the hole size, such as by using a capillary device.

Capillary devices have been used in other types of technology, by using a threaded member inside a tube which may be either smooth or internally threaded to form a very small, but long, capillary path. See for example: U.S. Pat. Nos. 2,265,888, issued Dec. 9, 1941, to Rudolf Beck for "Liquid Level Indicator"; 2,568,123, issued Sep. 18, 1951, to Herman M. Goldberg for "Pressure Reducing Device for Refrigerating Apparatus"; 3,841,354, issued Oct. 15, 1974, to Roy Edward McDonnel for "Flow Regulating Device"; 3,791,619, issued Feb. 12, 1974, to Alfred W. Pett for "Valve Construction"; 3,143,145, issued Aug. 4, 1964, to James M. Kauss for "Method and Means of Controlling the Rate of Fluid Flow" and 2,850,038, issued Sep. 2, 1958, to Hubert A. Shabaker for "Flow Control Device"; and Norwegian Patent No. 923962.

As far as we are aware, no such capillary device has been used to adjust the flow rate in a differential pressure operated flow control device.

SUMMARY OF THE INVENTION

One of the purposes of the invention is to provide a constant differential pressure flow regulator that will operate accurately at very high pressures, for example, where $P_1$ may be 12,900 p.s.i., $P_2$ is 12,896 p.s.i. and $P_3$ is zero and just as accurately when $P_1$ is 100 p.s.i., $P_2$ is 96 p.s.i. and $P_3$ is zero.

A typical commercially available constant flow regulator is available from W. A. Kates Company of Clawson, Mich. A Kate's regulator has a valve sleeve connected to the impeller. The sleeve slides on an apertured valve tube to form a variable outlet valve opening. The valve tube usually has three holes which pass fluid from the impeller chamber through the valve opening. Present technology, as described above, controls $P_2$ in relation to $P_1$, and $P_3$ can be whatever the system usage creates. This works extremely well when the pressure differential between $P_1$ and $P_3$ is less than 5000 p.s.i.g. When the $\Delta P$ is greater than 5000 p.s.i.g., the required travel of the impeller and the valve sleeve is too great and the flow accuracy cannot be maintained. In addition the required orifice area of the valve tube which is required to pass 10 gallon/minute with a 100 p.s.i. differential is too many times greater than the required area to pass 0.3 gallon/day with a 12,900 p.s.i. differential.

The inventive regulating device will control $P_3$ (now defined as the pressure of the fluid passing from the impeller chamber) to always be within a given pressure difference of $P_1$ despite extremely high pressures such as 12,900 p.s.i. For example, if $P_3$ can be controlled to be within 600 p.s.i. of $P_1$, we can maintain a $\Delta P$ of 20 p.s.i. between $P_1$ and $P_2$, and the $\Delta P$ between $P_2$ and $P_3$ never greater then 580 p.s.i., thereby reducing the required travel of the valve sleeve, the compression of the spring, and consequently the error in flow accuracy.

A second differential pressure control valve is connected between the incoming fluid at pressure $P_1$, and the outlet opening of the primary impeller chamber which is discharging fluid at pressure $P_3$. The second control valve maintains $P_3$ within 600 p.s.i. or some predetermined pressure difference from $P_1$.

The second control valve has an impeller in a second impeller chamber. The incoming pressure $P_1$ is introduced on the high side of the second impeller. A 600 p.s.i. compression impeller spring is used. $P_3$ the fluid pressure on both the low side of the second impeller and the outlet of the primary impeller chamber, is maintained at $P_1$ minus the force of the second impeller spring. The second control valve will require a long stroke when regulating between a range of 100 p.s.i. to 12,900 p.s.i., which will produce an error due to the spring compression. However, the first control valve can easily handle an error (range) of 100% or plus/minus 600 p.s.i.

The error of the flow regulator is reduced because the $\Delta P$ of $P_2$ and $P_3$ is always within an acceptable range, for example, 600 p.s.i. The second impeller, in effect, controls $P_3$ and thereby reduces the error usually caused by an extreme fluctuation in high incoming fluid pressure, or extreme fluctuations of the usual downstream pressure.

Another object of the invention is to provide a capillary device for sensing, and providing an adjusted flow rate, in a differential pressure operated flow regulating device. The capillary device uses a helical fluid flow path having an adjustable length to accommodate a high pressure, low flow rate.

In its simplest form, the preferred capillary device comprises a helical threaded member mounted in a chamber having a cylindrical wall. The threads engage the cylindrical wall to form a helical flow path. Fluid is received in one end of the chamber and passed along the flow path to the opposite end of the chamber. The length of the flow path can be changed to adjust the flow rate through the flow regulating device by changing the position of the threaded member in the chamber.

The threaded member can be mounted in a chamber having one section with a relatively close fitting cylindrical surface, and another section with an enlarged cylindrical surface. The flow rate is adjusted by moving the threaded member between the two sections to either shorten or lengthen the flow path.

In some cases it may be desirable to provide a longer capillary flow path in a relatively compact structure. The threaded member can be formed in several telescopically mounted sections so that the incoming fluid passes along a short helical flow path in a first axial direction, then flows in a reverse direction through a second helical flow path, and reverses flow again through a third helical flow path and so forth.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
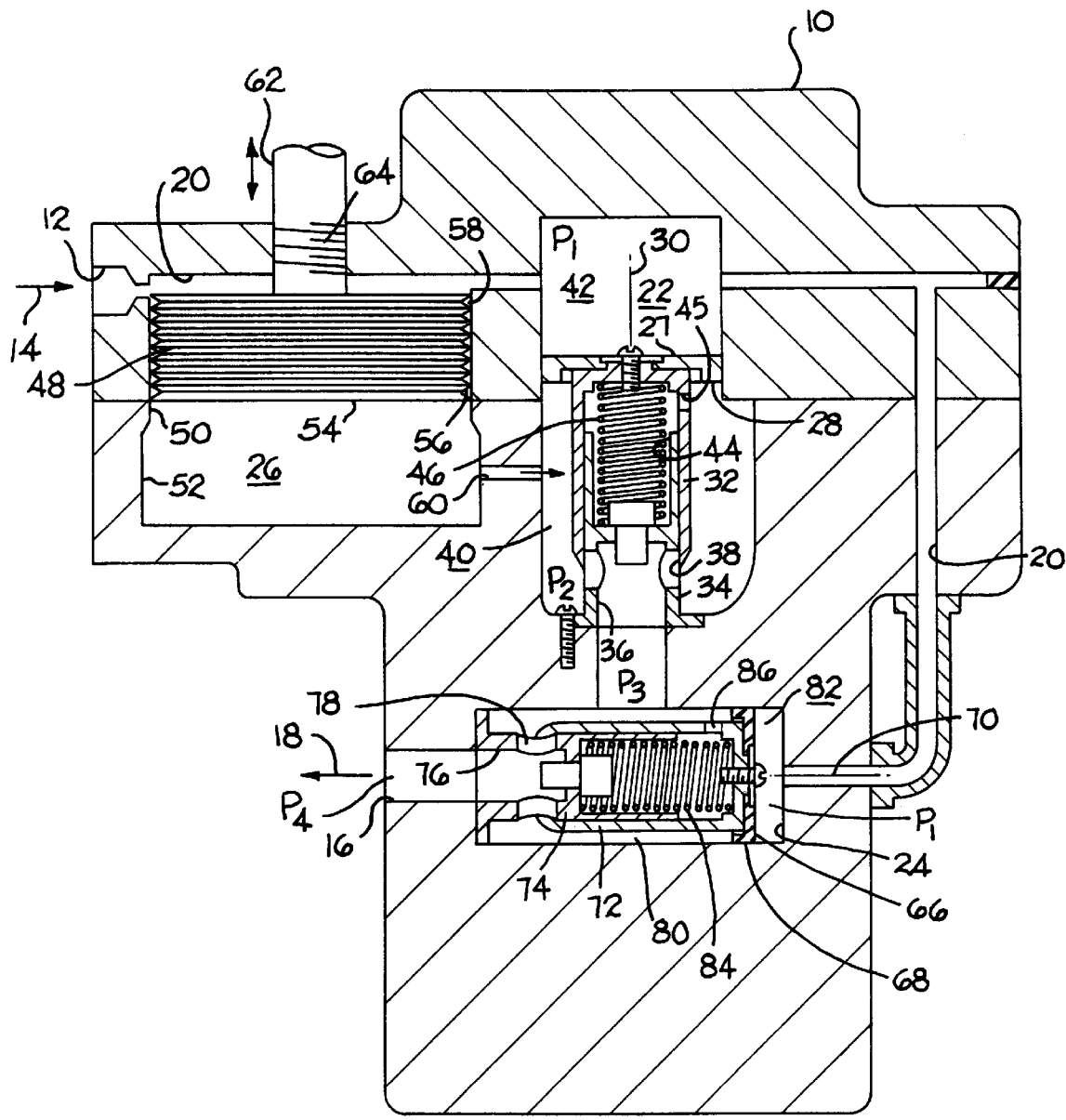
FIG. 1 is a sectional view through a high pressure, low flow regulator illustrating the preferred embodiment of the invention.

Referring to the drawings, FIG. 1 illustrates a preferred flow regulator having a housing 10 with an inlet port 12 for receiving fluid under a variable pressure, $P_1$, in the direction of arrow 14 from any suitable source, and an outlet port 16 for discharging fluid in a direction 18 at a constant flow rate. The housing has an internal fluid passage 20 which opens at inlet port 12, continues through a first cylindrical impeller chamber 22 and then to one end of a second cylindrical impeller chamber 24. Passage 20 is also fluidly connected to a cylindrical capillary chamber 26.

A pressure balanced impeller 27 is mounted in impeller chamber 22. Impeller 27 has a disc shaped head 28 with a peripheral edge slidably engaging the cylindrical wall of chamber 22. The edge of impeller 27 that contacts the chamber wall has a curvature formed along the surface of an imaginary sphere, to prevent the impeller from becoming cocked in the chamber. Impeller 27 is movable along chamber axis 30.

Impeller 27 is connected to a sleeve 32 which in turn is slidably mounted on a valve tube 34. Valve tube 34 is fastened to housing 10. The valve tube has an internal axial outlet port 36, and three lateral valve openings 38 disposed around the longitudinal axis of the tube.

The arrangement is such that as the impeller moves upwardly as viewed in FIG. 1, the lower edge of the sleeve enlarges valve openings 38 to discharge fluid from the low side 40 of the impeller chamber having a pressure $P_2$, less than pressure $P_1$. As the impeller moves in the opposite direction, the lower sleeve edge progressively reduces valve openings 38.

The area 42 of the impeller chamber, above the impeller head, will be referred to as the high pressure side of the chamber because the incoming fluid is at a pressure $P_1$ which is higher than in low pressure side 40.

The valve sleeve and the valve tube have an internal spring chamber 44 housing a helical impeller spring 46. Spring 46 has its lower end seated on the valve tube and its upper end engaging the valve sleeve to bias the impeller toward the high pressure side of the impeller chamber, as viewed in FIG. 1.

Valve sleeve 32 has port means 45 which permit fluid to pass between the low pressure side of the impeller chamber and spring chamber 44 to accommodate the changing volume of the spring chamber as the sleeve moves along the valve tube, and to make certain that the entire effective area of impeller 27 sees pressure $P_2$.

The position of impeller 27 depends upon the fluid pressure in the high pressure side, $P_1$, the fluid pressure in the low pressure side, $P_2$, and the force of spring 46 which combines with $P_2$ to bias the impeller toward a balanced position. The $\Delta P$ between $P_1$ and $P_2$ is determined by the spring force of spring 46. The impeller is in a stable position when $P_1$ equals $P_2$ plus the bias of spring 46.

The flow rate through the flow regulator is determined by a capillary control device 48 disposed between inlet port 12, and capillary chamber 26. Capillary chamber 26 has an upper portion 50 with a cylindrical side wall, and a lower portion 52 with a larger diameter cylindrical side wall formed about the same axis as upper portion 50.

A screw member 54, mounted in capillary chamber 26, has a continuous helical thread 56 formed around its outer annular surface. Thread 56 slidably engages the cylindrical side wall of the upper portion of chamber 26. The screw member and the chamber side wall form a helical flow passage 58 for passing fluid from inlet port 12 to the lower portion 52 of the capillary chamber and then out through a passage 60 to the low pressure side of the impeller chamber.

The fluid flow rate along passage 58 depends upon the flow restriction formed by the capillary device. The flow restriction, in turn, depends upon the diameter, the helical shape, and the length of capillary passage 58 which can be adjusted by moving screw member 54 downwardly into chamber portion 52. Moving a selected number of threads into chamber portion 52 shortens the total length of the capillary path. Reducing the length of the flow path increases the flow rate. Increasing the length of the flow path reduces the flow rate, for the same pressure difference across the impeller.

The threads are illustrated as having the shape of conventional helical threads, however, the threads could be formed on the inner surface of the chamber with screw member 54 having a smooth cylindrical surface. Other alternatives are possible such as forming a pair of mating internal and external threads, with the tip of the threads on one or both parts flattened or otherwise shaped to adjust the flow restriction produced along the flow passage. Different geometric shapes of the cross sections of the helical opening will create different flow resistances. Flow passage 58 is triangular but it could be square, rectangular, oblong, etc.

For illustrative purposes, screw member 54 is connected to a shaft 62 which may be connected to a suitable electrical motor, hydraulic motor or pneumatic device, not shown, for remotely adjusting the position of the screw member. Shaft 62 is connected by a threaded connection 64 to housing 10. Alternatively, shaft 62 could have a smooth sealed engagement with the housing, and pushed and pulled by a suitable power device, not shown.

The second impeller chamber 24 houses an impeller assembly 66 which is similar to impeller assembly 27 in chamber 22. This includes a disc-shaped impeller 68 which has its peripheral edges slidably engaging the cylindrical side wall of the impeller chamber for movement along a horizontal chamber axis 70 as viewed in FIG. 1. Impeller 68 also has a peripheral surface formed along the surface of an imaginary sphere to prevent the impeller from becoming cocked in the impeller chamber. Impeller 68 is fastened to the head of a cylindrical valve sleeve 72 so that the impeller and the sleeve move together as a unit.

Valve tube 74 is attached to housing 10 and has a cylindrical outer surface, and a hollow bore 76 fluidly connected with outlet port 16. Tube 74 has three (more or less) port means 78 disposed equi-angularly about the longitudinal axis of the valve tube for passing fluid from the low pressure side 80 of impeller chamber 24 to the outlet port.

Sleeve 72 slides along valve tube 74. The left edge of sleeve 72, as shown in FIG. 1, overlaps port means 78 to form a valve opening having a variable size. The total valve opening size depends upon the position of the impeller in the second impeller chamber which in turn depends upon fluid pressure, $P_1$, in high pressure side 82, the fluid pressure in the low pressure side, $P_3$, and the bias or force of impeller spring 84. Spring 84 is disposed in a spring chamber formed between valve tube 74 and valve sleeve 72.

Port means 86 in the valve tube permit fluid to pass into and out of the spring chamber as the valve sleeve moves along the valve tube to accommodate the changing volume of the spring chamber, and to make certain that the low pressure side of impeller 68 sees $P_3$.

Assuming the incoming fluid pressure $P_1$ is 12,900 p.s.i., then this pressure will exist on the high pressure sides of both impeller chambers 22 and 24.

The low pressure side 40 of the primary impeller chamber will have a pressure $P_2$ that is dictated by the effective force of impeller spring 46. Assuming a 20 p.s.i. impeller spring, $P_2$ will be 12,880 p.s.i. Impeller 27 will then be disposed in a stable position when $P_1=P_2$ plus the force of the impeller spring.

The fluid passing through valve openings 38 to the low pressure side of the second impeller chamber will be at a pressure $P_3$ that is dictated by the bias of spring 84 in the second impeller chamber. Assuming that spring 84 is a 100 pound spring (100 p.s.i. bias), then pressure $P_3$ existing on the low side of the second impeller chamber will be 12,800 p.s.i. that is 100 p.s.i. less than $P_1$. Outlet pressure $P_4$ may vary but will not affect the performance of the regulator. This permits us to reduce the necessary travel of valve sleeve 32 and consequently the compression of spring 46 thereby reducing the error in the flow accuracy of the regulator. The reason is that $P_3$ is limited to the pressure differential across the second impeller defined by spring 84. If $P_1$ is less than the force of spring 84, port means 78 will remain open and have no effect on the flow regulator.

In summary, the incoming fluid enters the device through inlet port 12 at pressure $P_1$. Passage 20 transmits the same pressure $P_1$ to the high pressure side of both impeller chambers. The fluid passes along capillary flow passage 58 into the bottom of capillary chamber 26. It then flows into the low pressure side 40 of impeller chamber 22, at pressure $P_2$ where the impeller is in a balanced position. The fluid then passes through valve openings 38 where its pressure is reduced to $P_3$, the same as the low pressure side 80 of impeller chamber 24. The fluid then passes through port means 78 and outlet port 16 where its pressure becomes $P_4$, the existing downstream pressure which is controlled by means of a device other than this regulator.

The accuracy of the regulator to maintain a constant flow rate is achieved by limiting the maximum difference in pressure between $P_2$ and $P_3$, even though the incoming pressure $P_1$ may be several thousand p.s.i.

Figure 2:
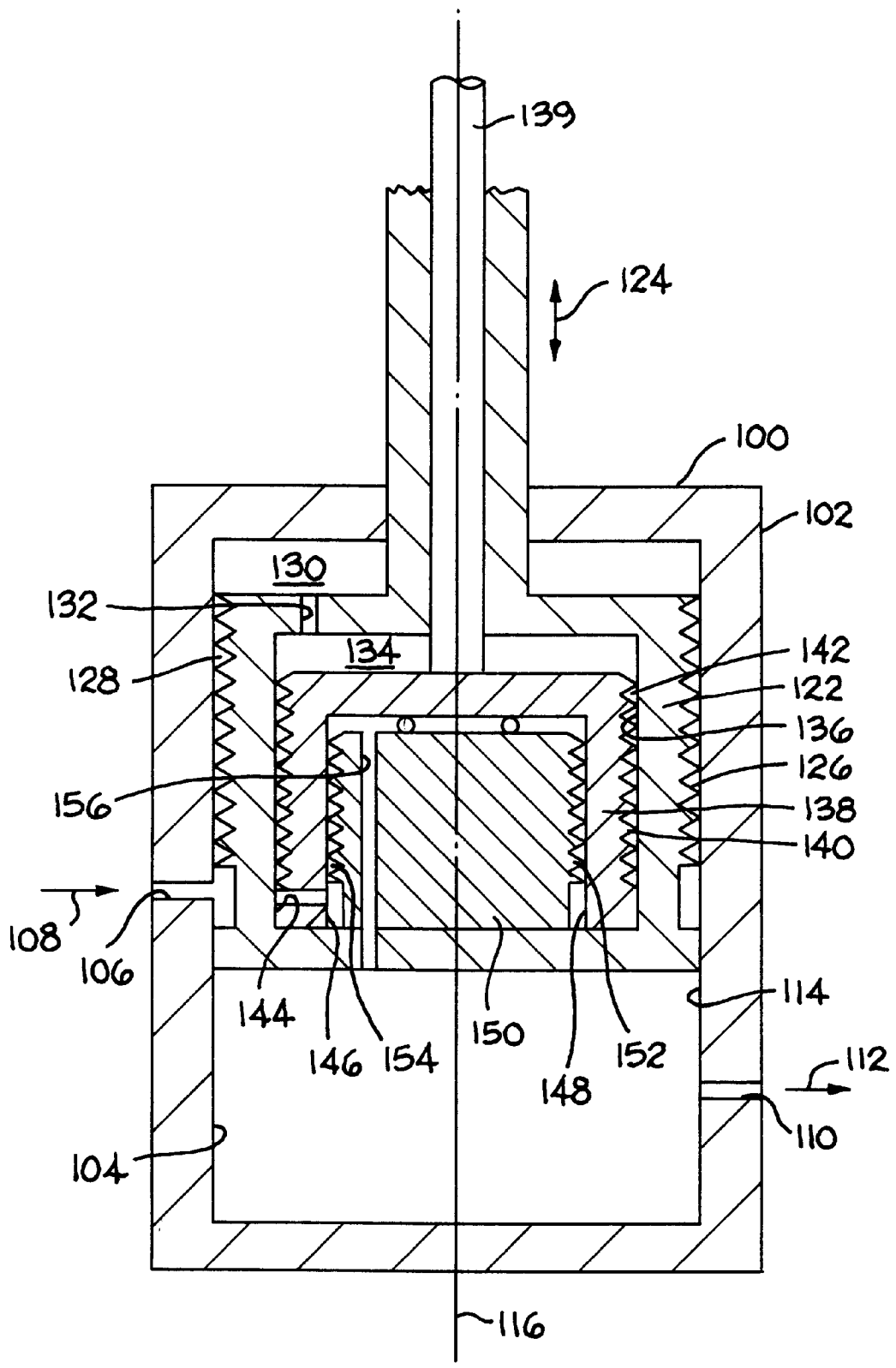
FIG. 2 is a sectional view through another embodiment of a preferred capillary sensing device.

In some situations it may be desirable to provide a greater range of adjustability in high pressure, low flow rates. Existing regulations require 30 different valves to accommodate flow ranges from 0.3 to 1200 gallons per day. Prior art capillary devices require a relatively long axial length at the low flow rates. A long axial length usually requires a long housing structure. FIG. 2 illustrates a capillary device 100 having a short housing which may be substituted for the capillary device illustrated in FIG. 1.

Capillary device 100 includes a body 102 having an internal capillary chamber 104 with inlet port 106 for receiving incoming fluid in the direction of arrow 108, and a discharge port 110 for discharging fluid in the direction of arrow 112. Discharge port 110 may be connected by a conduit, not shown, to the low pressure side of an impeller chamber.

Capillary chamber 104 has a cylindrical internal wall 114 formed about an axis 116. A hollow piston 122 is mounted in chamber 104 and is axially moveable in the direction of arrows 124 along axis 116 by any suitable power means, not shown. Piston 122 has an annular array 126 of helical threads which slidably engage cylindrical wall 114. The threads on piston 122 and cylindrical wall 114 define a capillary flow path 128 extending from inlet port 106 to an upper chamber 130.

The fluid passes from upper chamber 130 through a port 132 in the piston into an internal piston chamber 134. Piston chamber 134 has a cylindrical side wall 136. A second piston 138 is disposed in chamber 134 and is connected to an axial shaft 139. The height of piston 138 is shorter than the height of chamber 134 so that piston 138 can be moved axially a short distance. Piston 138 has a second helical array of threads 140 slideable engaged with cylindrical wall 136.

The fluid passes axially from the top part of chamber 134 along a second helical flow path 142 down to a port 144 that passes through the wall of the piston into another chamber 146 inside piston 138. Chamber 146 also has a cylindrical side wall 148 formed about axis 116. Another piston 150 is disposed inside chamber 146 and carries a third section of helical threads 152 that slidably engage cylindrical wall 148. The fluid passes from port 144 upwardly along a helical flow path 154 formed between threads 152 and the cylindrical wall 148 to the top part of chamber 146, then exits through a passage 156 downwardly as viewed in FIG. 2 into the bottom of chamber 104. The fluid then passes through discharge port 110 to its destination.

This capillary device produces a desired fluid flow rate that depends upon the overall length of the multiple capillary flow paths as well as the diameter of the flow path. The length of the flow path is adjusted by moving piston 138 in chamber 134 to either increase or reduce the effective length of flow path 142.

Having described our invention, we claim:

1. A high pressure, low fluid flow regulating device, comprising:

housing means having a fluid inlet opening, a first impeller chamber and a second impeller chamber;

the first impeller chamber having a high pressure area fluidly connected to the fluid inlet opening for receiving fluid therein from the inlet opening at a fluid pressure $P_1$, a low pressure area for receiving fluid from the fluid inlet opening at a lesser fluid pressure $P_2$, and a first variable outlet valve opening for passing fluid from the low pressure area;

the second impeller chamber having a high pressure area fluidly connected to the fluid inlet opening for receiving fluid at a fluid pressure $P_1$, a low pressure area for receiving fluid at a lesser pressure $P_3$, and a second variable outlet valve opening for discharging fluid from the low pressure area of the second impeller chamber;

first conduit means for fluidly connecting the fluid inlet opening to the low pressure area of the first impeller chamber;

flow restriction means in the first conduit means defining a predetermined fluid flow rate from the fluid inlet opening to the low pressure area of the first impeller chamber;

second conduit means for fluidly connecting the first variable outlet valve opening to the low pressure area of the second impeller chamber, whereby fluid can pass from the low pressure area of the first impeller chamber to the low pressure area of the second impeller chamber;

a first impeller piston movably disposed in the first impeller chamber between the high pressure area and the low pressure area therein;

the first impeller piston being operative to vary the effective area of the first variable outlet valve opening in the first impeller chamber in response to forces in the high pressure area and the low pressure area in the first impeller chamber acting on opposite sides of the first impeller piston;

a second impeller piston movably disposed in the second impeller chamber between the high pressure area and the low pressure are therein;

the second impeller piston being operative to vary the effective area of the second variable outlet valve opening to thereby reduce the pressure of the fluid passing from the low pressure area of the first impeller chamber at $P_2$ to pressure $P_3$ as the fluid is received in the low pressure area of the second impeller chamber in response to forces in the high pressure area and the low pressure area of the second impeller chamber acting on opposite sides of the second impeller piston;

means forming said first variable outlet valve opening comprising:

a hollow tube having a cylindrical outer surface formed about an axis and disposed in said first impeller chamber, the tube having a lateral opening for receiving fluid from the low pressure area of the first impeller chamber into the interior of the tube, and an axial end opening fluidly connecting the interior of the tube to the second conduit means;

a valve sleeve connected to the first impeller piston so as to be moveable therewith, said sleeve being telescopically mounted on the tube so as to be slidably moveable along the tube to partially close said lateral opening through which fluid can pass to the second conduit means a compression spring disposed between the tube and the sleeve to urge the sleeve in an axial direction to balance axial forces acting on the sleeve, such that the sleeve moves in said axial direction in response to a change in said fluid pressure $P_1$ to either open or to close said lateral opening to maintain the fluid flow equal to a desired flow through the second conduit means regardless of changes in either said fluid pressure $P_1$ or said lesser fluid pressure $P_2$, whereby the regulating device passes fluid at said predetermined fluid flow rate from said fluid inlet opening through the second variable outlet valve opening over a substantial range of inlet fluid pressures.

2. A fluid regulating device as defined in claim 1, in which the compression spring biases the first impeller piston toward a balanced position in which fluid pressure $P_1$ equals fluid pressure $P_2$ plus the bias of the spring as fluid pressure $P_1$ is varied.

3. A fluid regulating device as defined in claim 1, including a second compression spring biasing the second impeller piston toward a balanced position in which fluid pressure $P_1$ equals fluid pressure $P_3$ plus the bias of the second compression spring as fluid pressure $P_1$ is varied.

4. A flow regulating device as defined in claim 1, including capillary means providing a helical fluid flow path between the fluid inlet opening and the low pressure area of the first impeller chamber to provide a helical fluid flow paths between the fluid inlet opening and the low pressure area of the first impeller chamber.

5. A flow regulating device as defined in claim 4, including means for varying the length of the helical fluid flow path to adjust the fluid flow rate.

6. A flow regulating device as defined in claim 4, in which said capillary means includes a pair of telescopically engageable members including a first member having an internal annular surface, and a second member having an external annular surface facing the internal annular surface of the first member, helical means between said annular surfaces defining a helical fluid flow path between said annular surfaces, and means for moving one of said members with respect to the other of said members to vary the length of said fluid flow path.

7. A flow regulating device as defined in claim 4, in which said capillary means includes a plurality of concentric, annular members having a plurality of concentric annular surfaces disposed in concentric opposed pairs, and helical structure disposed between said opposed pairs of annular surfaces to define a plurality of helical flow paths, and fluid passage means connecting said plurality of helical flow paths to form a continuous fluid flow path.

8. In a high pressure, low flow regulating device, comprising an impeller chamber having a high pressure area for receiving fluid therein at a fluid pressure $P_1$, a low pressure area for receiving fluid at a lesser fluid pressure $P_2$, and a variable outlet valve opening for passing fluid from the low pressure area; an impeller piston movably mounted in the impeller chamber between the high pressure area and the low pressure area in the impeller chamber and operative to vary the outlet valve opening in response to changing fluid forces in the high pressure area and the low pressure area acting on opposite sides of the impeller piston;

capillary means for providing an elongated, non-linear fluid flow path to the low pressure area of the impeller chamber, said capillary means being adjustable to define the fluid flow rate along said fluid flow path means forming said variable outlet valve opening comprising:

a hollow tube having a cylindrical outer surface formed about an axis and disposed in said impeller chamber, the tube having a lateral opening for receiving fluid from the inlet opening into the interior of the tube, and an axial end opening fluidly connecting the interior of the tube to an outlet opening, a valve sleeve connected to the impeller piston so as to be movable therewith, said sleeve being telescopically mounted on the tube so as to be slidably moveable along the tube to partially close said lateral opening through which fluid can pass to the outlet opening; and a compression spring disposed between the tube and the sleeve to urge the sleeve in an axial direction to balance axial forces acting on the sleeve, such that the sleeve moves in said axial direction in response to a change in a first fluid pressure $P_1$ in the high pressure area to either open or to close said lateral opening to maintain the fluid flow equal to a desired constant flow regardless of changes in either said pressure $P_1$ or said lesser pressure $P_2$.

9. A high pressure, low fluid flow regulating device, comprising:

housing means having a fluid inlet opening, a first impeller chamber and a second impeller chamber;

the first impeller chamber having a high pressure area fluidly connected to the fluid inlet opening for receiving fluid therein from the inlet opening at a fluid pressure $P_1$, a low pressure area for receiving fluid from the fluid inlet opening at a lesser fluid pressure $P_2$, and a first variable outlet valve opening for passing fluid from the low pressure area;

the second impeller chamber having a high pressure area fluidly connected to the fluid inlet opening for receiving fluid at a fluid pressure $P_1$, a low pressure area for receiving fluid at a lesser pressure $P_3$, and a second variable outlet valve opening for discharging fluid from the low pressure area of the second impeller chamber;

first conduit means for fluidly connecting the fluid inlet opening to the low pressure area of the first impeller chamber;

flow restriction means in the first conduit means defining a predetermined fluid flow rate from the fluid inlet opening to the low pressure area of the first impeller chamber;

second conduit means for fluidly connecting the first variable outlet valve opening to the low pressure area of the second impeller chamber, whereby fluid can pass from the low pressure area of the first impeller chamber to the low pressure area of the second impeller chamber;

a first impeller piston movably disposed in the first impeller chamber between the high pressure area and the low pressure area therein;

the first impeller piston being operative to vary the effective area of the first variable outlet valve opening in the first impeller chamber in response to forces in the high pressure area and the low pressure area in the first impeller chamber acting on opposite sides of the first impeller piston;

a second impeller piston movably disposed in the second impeller chamber between the high pressure area and the low pressure area therein;

the second impeller piston being operative to vary the effective area of the second variable outlet valve opening to thereby reduce the pressure of the fluid passing from the low pressure area of the first impeller chamber at $P_2$ to pressure $P_3$ as the fluid is received in the low pressure area of the second impeller chamber in response to forces in the high pressure area and the low pressure area of the second impeller chamber acting on opposite sides of the second impeller piston;

means forming said first variable outlet valve outlet opening comprising:

a hollow support tube located within said housing means in axial alignment with said outlet opening;

said first impeller piston comprising an enlarged head mounted on a valve sleeve slidable on said tube;

spring means within said support tube biasing said first impeller piston toward said fluid inlet opening;

plural flow control ports in said support tube communicating the low pressure area of the first impeller chamber with said second conduit means; and said valve sleeve having a downstream edge movable across said flow controls ports to progressively reduce the port flow areas as the first impeller piston moves away from said inlet opening;

whereby the regulating device passes fluid at said predetermined fluid flow rate from said fluid inlet opening through the second variable outlet valve opening over a substantial range of inlet fluid pressures.

\* \* \* \* \*